July 1, 1930. T. F. BRACKETT 1,768,882
FRICTION BRAKE
Filed Oct. 19, 1928
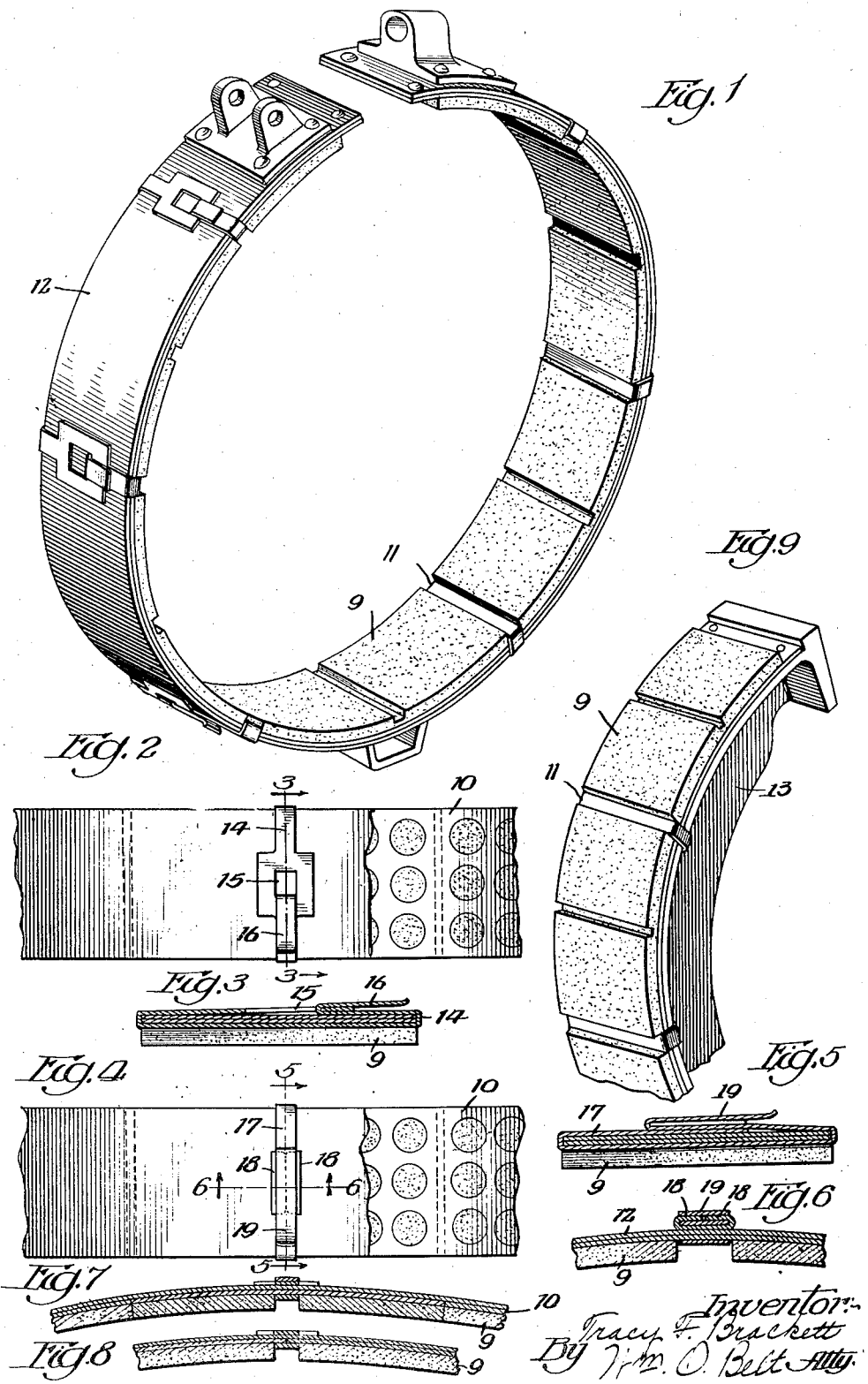

Patented July 1, 1930

1,768,882

UNITED STATES PATENT OFFICE

TRACY F. BRACKETT, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Application filed October 19, 1928. Serial No. 313,507.

This invention relates to friction brakes and its object is to provide a simple and novel means for securing a friction block on a support such as a brake band or shoe.

And a further object is to provide a plurality of brake blocks on a brake band or shoe, the blocks being separate and arranged end to end or made in strip form and having transverse grooves, and fastening bands seated in said grooves and securing the blocks to the brake band or shoe.

I have illustrated the invention in a selected embodiment in the accompanying drawings in which Fig. 1 is a perspective view of a brake band with my invention thereon.

Fig. 2 is an outside plan view of a portion of the band brake, the band being partly broken away to show the back of the block.

Fig. 3 is a transverse sectional view on line 3—3 Fig. 2.

Fig. 4 is a view similar to Fig. 2 but showing another form of the fastening band.

Figs. 5 and 6 are sectional views on lines 5—5 and 6—6 of Fig. 4.

Fig. 7 is a longitudinal sectional view showing a groove midway between the ends of the block.

Fig. 8 is a similar view showing the groove at the ends of abutting blocks.

Fig. 9 is a perspective view showing a portion of a modified form of the brake block.

Referring to the drawings, the friction block comprises a composition body 9 mounted on a metal back 10. The blocks are provided with transverse grooves 11 to receive the bands whereby the blocks are fastened to the brake band 12 (Fig. 1) or to the brake shoe or head 13 (Fig. 9). The groove may be located between the ends of a block Fig. 7 or at the ends of abutting blocks and partly in each Fig. 8, and the grooves preferably have parallel side walls and a flat bottom to readily accommodate the fastening band. In Figs. 2 and 3 the fastening band 14 has an eye 15 at one end to receive the other end 16 which is drawn taut through the eye and bent back upon the band to fasten the band around the block and brake band or shoe and secure the block thereon. In Figs. 4–6 the band 17 has two side wings 18 at one end which are bent over upon the band to form an eye to receive the other end 19 of the band which is drawn taut through the eye and bent back upon the band to fasten the band in place and the block to the brake band or shoe. The invention provides a simple means for easily and quickly applying the brake blocks separately or in strip form to a brake band or to a brake shoe or head.

I have shown and described the invention in forms which I believe will be entirely satisfactory, but I reserve the right to make changes therein within the scope of the following claims.

I claim:

1. In a friction brake, the combination of a support, a brake block having a groove in its wearing face, and a fastening band looped transversely around the support and block and seated in the groove in the block to fasten the block on the support.

2. In a friction brake, the combination of a support, a brake block having a transverse groove in its wearing face, and a fastening band looped tightly around the support and block and seated in the groove in the block to fasten the block on the support.

3. In a friction brake, the combination of a support, a brake block having a groove in its wearing face, and a fastening band looped transversely around the support and block and seated in the groove to fasten the block on the support, the ends of said band being fastened together at the back of the support.

4. In a friction brake, the combination of a support, a brake block having a groove in its wearing face, and a fastening band looped transversely around the support and block and seated in the groove to fasten the block on the support, said band having an eye at one end and the other end being passed through the eye and bent over to interlock with the eye.

5. In a friction brake, the combination of a support, a brake block comprising a composition body and a metal back, said body having a transverse groove in its wearing face, and a flat metal band looped tightly around the support and the back and seated in the groove to secure the block thereto.

6. In a friction brake, the combination of a support, a brake block comprising a composition body and a metal back, the ends of the back extending beyond the ends of the body, and a fastening band looped transversely around the support and the abutting ends of the backs of adjacent blocks to fasten the blocks on the support.

TRACY F. BRACKETT.